United States Patent
Cansell et al.

(10) Patent No.: US 7,521,086 B2
(45) Date of Patent: Apr. 21, 2009

(54) METHOD FOR OBTAINING A COMPOSITE FERRO-ELECTRIC MATERIAL

(75) Inventors: François Pierre Michel Cansell, Pessac (FR); Cyril Gérard Jacques Aymonier, Begles (FR); Christophe Antoine Stéphane Huber, Achenheim (FR); Catherine Jocelyne Elissalde, Begles (FR); Mario Maglione, Leognan (FR)

(73) Assignee: Centre National de la Recherche Scientifique (CNRS), Paris (FR)

( * ) Notice: Subject to any disclaimer, the term of this patent is extended or adjusted under 35 U.S.C. 154(b) by 31 days.

(21) Appl. No.: 10/575,472

(22) PCT Filed: Oct. 12, 2004

(86) PCT No.: PCT/FR2004/002580

§ 371 (c)(1),
(2), (4) Date: Apr. 12, 2006

(87) PCT Pub. No.: WO2005/038082

PCT Pub. Date: Apr. 28, 2005

(65) Prior Publication Data

US 2007/0082803 A1    Apr. 12, 2007

(30) Foreign Application Priority Data

Oct. 13, 2003    (FR) .................................. 03 11963
Oct. 16, 2003    (FR) .................................. 03 12086

(51) Int. Cl.
  *B05D 7/00*    (2006.01)
  *B05D 5/12*    (2006.01)
  *C04B 35/00*   (2006.01)

(52) U.S. Cl. .................. 427/215; 427/58; 427/100; 427/115; 427/126.2; 427/212; 501/134

(58) Field of Classification Search ................ 501/127, 501/1, 134; 42/249; 427/58, 100, 115, 126.2, 427/212, 215
See application file for complete search history.

(56) References Cited

U.S. PATENT DOCUMENTS

| 4,552,786 A | * | 11/1985 | Berneburg et al. | ..... 427/249.15 |
| 5,164,348 A | * | 11/1992 | Wood | .......................... 501/127 |
| 5,523,065 A | * | 6/1996 | Stangle et al. | ................. 423/71 |
| 6,087,003 A | * | 7/2000 | Benoit et al. | ................. 428/403 |

(Continued)

OTHER PUBLICATIONS

Chen, R et al. Structure, sintering behavior and dielectric properties of silica-coated BaTiO3. Materials Letters. North Holland Publishing Company; Amsterdam, NL. vol. 54, No. 4, Jun. 2002. p. 314-317.*

(Continued)

*Primary Examiner*—Karl E Group
*Assistant Examiner*—Noah S Wiese
(74) *Attorney, Agent, or Firm*—Foley and Lardner LLP

(57) ABSTRACT

The invention relates to a method for obtaining a composite ferro-electric material, consisting of the following stages: particles of a ferro-electric compound are covered with a dielectric layer; a dense composite material is formed by sintering the covered particles. The invention is characterized in that in the covering stage the particles of the ferro-electric compound are brought into contact with a fluid containing at least one solvent and a precursor of the dielectric compound, said fluid being pressurized.

15 Claims, 7 Drawing Sheets

U.S. PATENT DOCUMENTS

| | | | |
|---|---|---|---|
| 6,087,287 | A | 7/2000 | Iguchi et al. |
| 6,337,032 | B1 | 1/2002 | Chivukula et al. |
| 6,426,116 | B1 * | 7/2002 | Sunol .......................... 427/217 |
| 6,592,938 | B1 * | 7/2003 | Pessey et al. ................. 427/212 |
| 6,958,308 | B2 * | 10/2005 | Brown ......................... 502/180 |

OTHER PUBLICATIONS

Caballero, A.C. et al. Dopant Distribution and Grain Growth Control in BaTiO3 Ceramics Doped with ZnO-SiO2-P2O5. Journal of the European Ceramic Society. Elsevier Science Publishers, Barking, Essex, GB. vol. 17, No. 10, Aug. 1997. p. 1223-1230.*

Chen et al. Structure, sintering behavior and dielectric properties of silica-coated BaTiO3. Materials Letters 54 (2002) p. 314-317.*

Caballero et al. Dopant Distribution and Grain Growth Control in BaTiO3 Ceramics Doped with ZnO-SiO2-P205. Journal of the European Ceramic Society 17 (1997) pag 1223-1230.*

Azough et al., "A Transmission Electron Microscope Study of Commercial X7R-Type Multilayer Ceramic Capacitors," Journal of the European Ceramic Society, 1998, 18, pp. 751-758.

Caballero et al., "Dopant Distribution and Grain Growth Control in $BaTiO_3$ Ceramics Dopes with $ZnO-SiO_2-P_2O_5$," Journal of the European Ceramic Society, 1997, 17, pp. 1223-1230.

Chen et al., "Structure, sintering behavior and dielectric properties of silica-coated $BaTiO_3$," Materials Letters, 2002, 54, pp. 314-317.

Huber et al., "New application of the core-shell concept to ferroelectric nanopowders," J. Mater. Chem., 2003, 13, p. 650-653.

* cited by examiner

FIG_3A
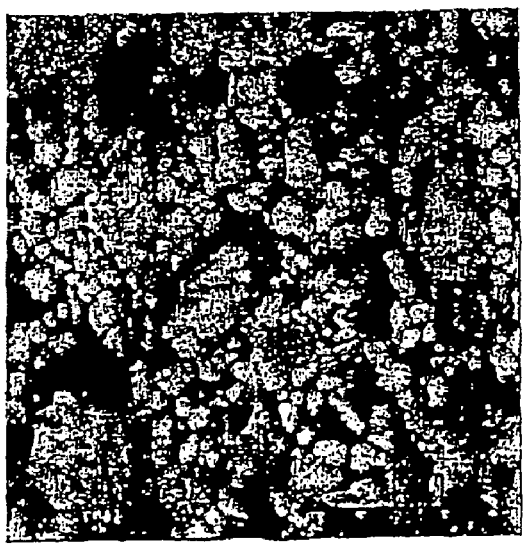
FIG_3B

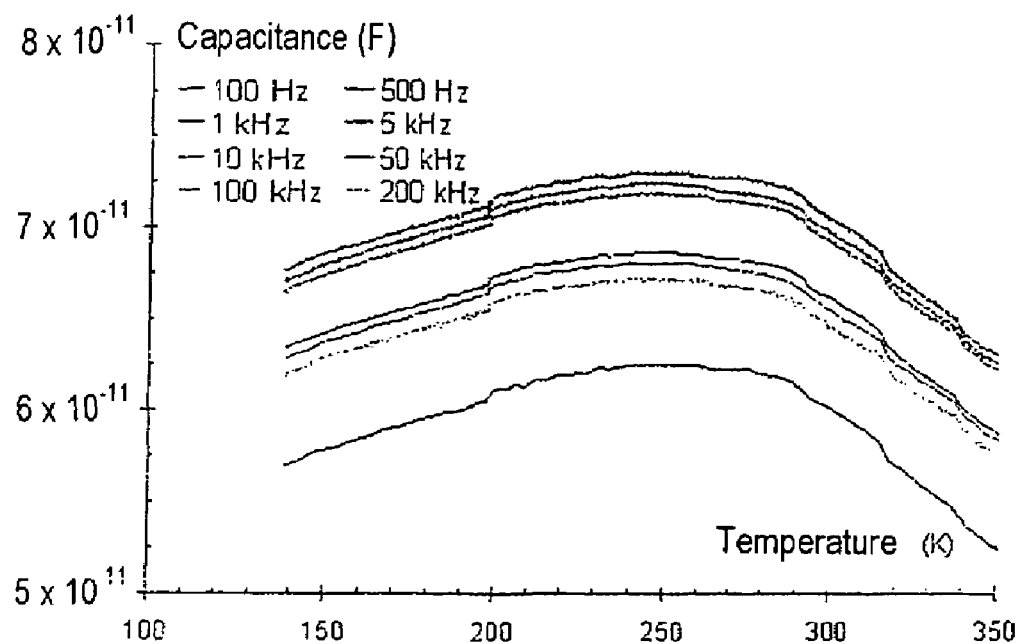
FIG_6A
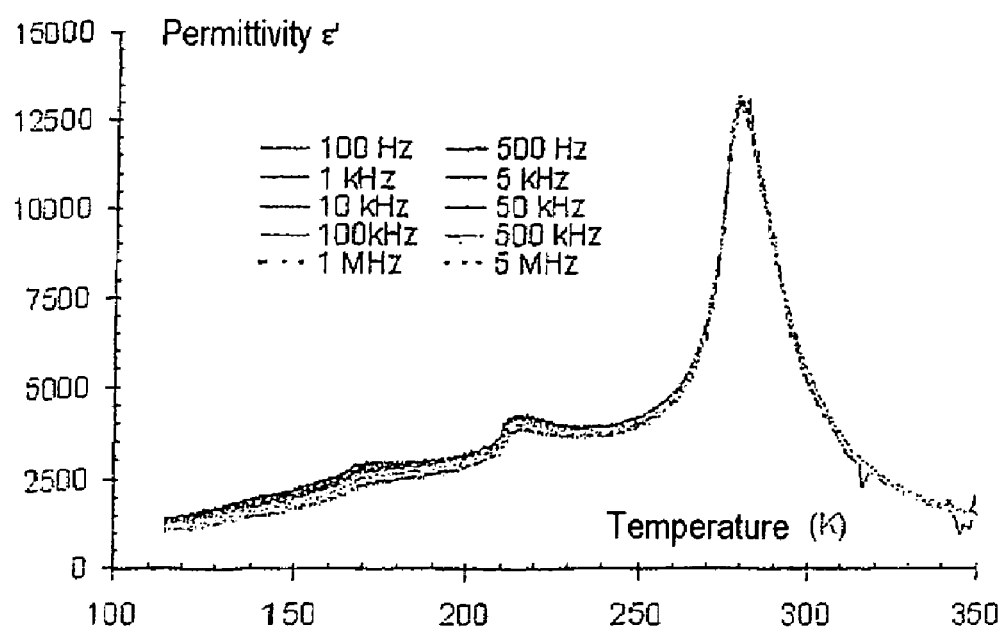
FIG_6B

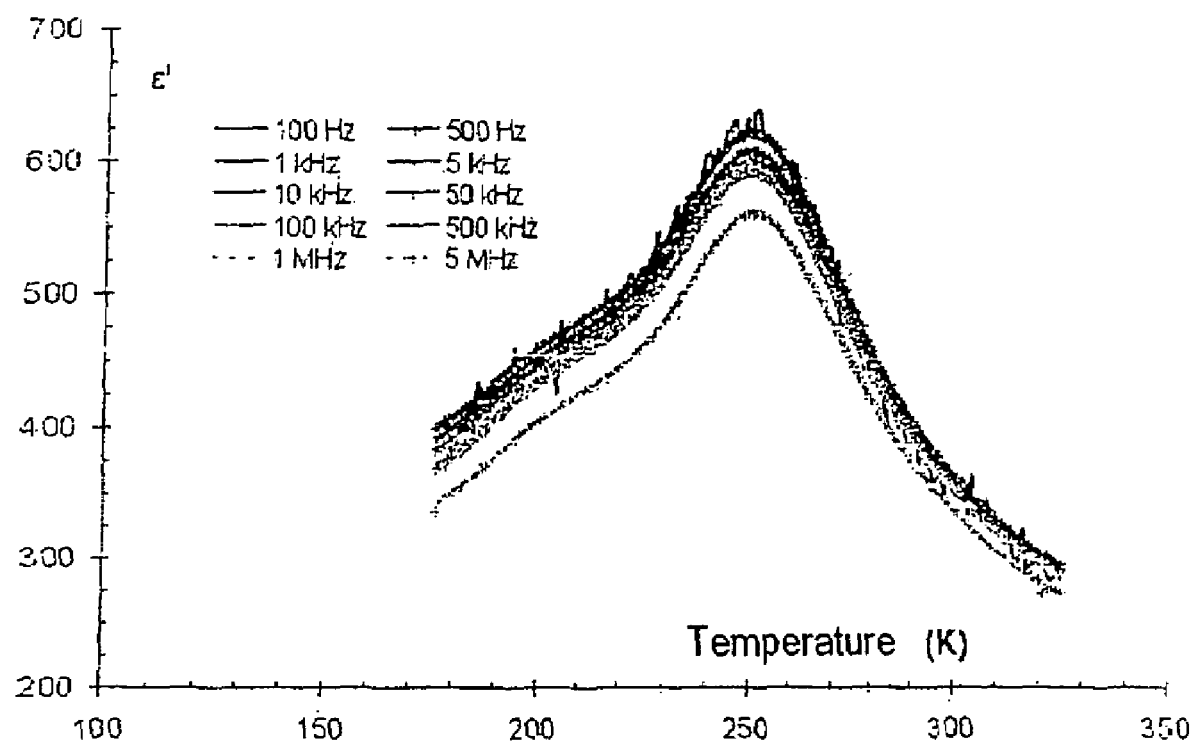
FIG_7

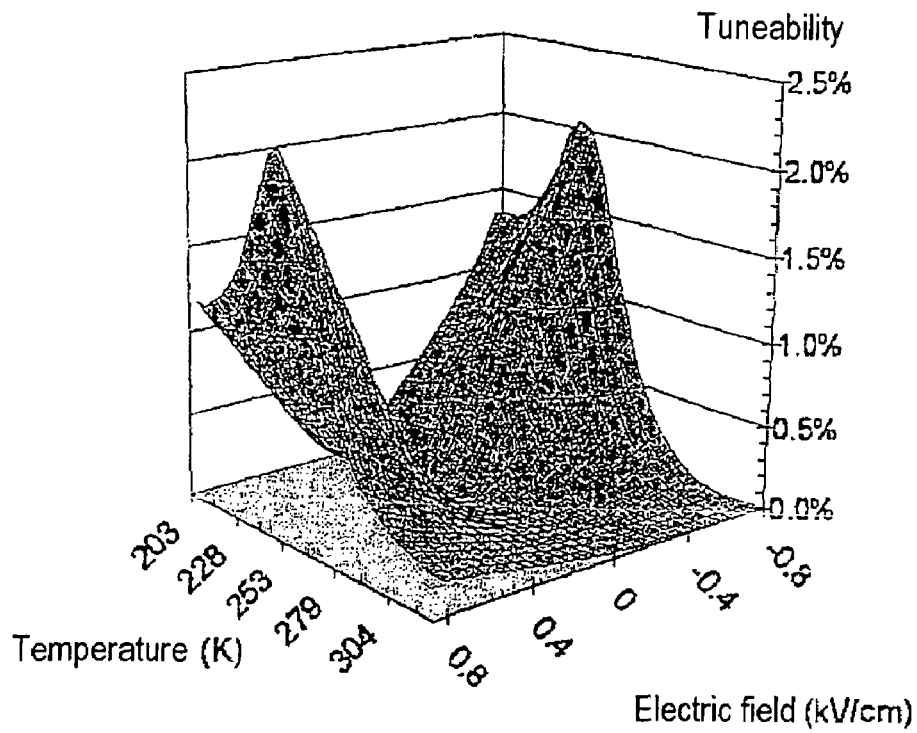
FIG_9
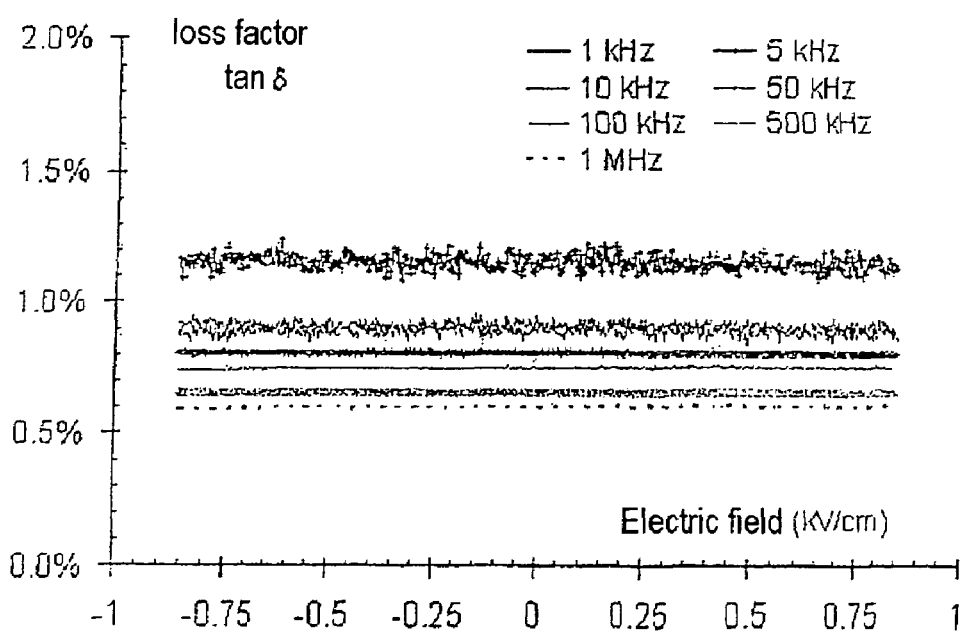
FIG_10

METHOD FOR OBTAINING A COMPOSITE FERRO-ELECTRIC MATERIAL

This application is a National Stage application of PCT/FR2004/002580, filed Oct. 12, 2004, which claims priority from French patent applications FR 03/11963, filed Oct. 13, 2003, and FR 03/12086, filed Oct. 16, 2003. The entire contents of each of the aforementioned applications are incorporated herein by reference.

The invention relates to the field of dielectric materials used in particular in the construction of high-frequency microelectronic components, such as capacitors, resonators, tuneable filters, propagation lines, phase shifters, etc., and also in radar antennas.

The invention applies in particular to the components present in telecommunication systems, the function of which is signal transmission, reception and filtering.

The materials used are generally composite materials comprising a ferroelectric compound and at least one low-loss dielectric compound, generally in the form of an oxide. The presence of a low-loss dielectric compound improves the electronic properties of the ferroelectric material.

These materials may be obtained by conventional ceramic processes, consisting in mixing powders containing a ferroelectric phase and a low-loss dielectric phase. In this regard, the reader may refer to the following publications:

E. F. Alberta, R. Guo and A. S. Bhalla, "Novel BST:MgTiO$_3$ composites for frequency agile applications", Ferroelectrics, 2002, Vol. 268, pp. 169-174, this document disclosing a composite material obtained by mixing Ba$_{1-x}$Sr$_x$TiO$_3$ (BST) with MgTiO$_3$ (MT) and by sintering the mixture; and Z. X. Xiong, X. J. Zhou, W. Z. Zen, K. Z. Baba-Khishi and S. T. Chen, "Development of ferroelectric ceramics with high dielectric constant and low dissipation factor for high-voltage capacitors", this document disclosing a composite formed from BaTiO$_3$, BaZrO$_3$ and BaSnO$_3$ doped with MnSiO$_3$, WO$_3$, CeO$_2$, Bi$_2$(SnO$_3$)$_3$ and ZnO.

Certain techniques for obtaining these materials consist in forming particles of the "core/shell" type. These particles are formed by coating particles of a ferroelectric compound, generally with a thin dielectric layer. They are then sintered to form a dense composite.

The coating techniques employed may be sol-gel coating techniques. In this regard, the reader may refer to the following publications:

X. Liu, W. Y. Shin and W. H. Shih, "Effects of copper coating on the crystalline structure of the fine barium titanate particles", Journal of the American Ceramic Society, 1997, 80(11), pp. 2781-2788, this document disclosing a technique for coating BaTiO$_3$ particles with a copper layer;

T. M. Harkulich, J. Magder, M. S. Vukasovich and R. J. Lockhart, "Ferroelectrics of ultrafine particle size: II, grain growth inhibition studies", Journal of the American Ceramic Society, 1966, 49(6), pp. 295-9, this document disclosing a technique for coating BaTiO$_3$ particles with a tantalum oxide layer;

C. Huber, M. Treguer-Delapierre, C. Elissalde, F. Weill and M. Maglione, "New application of the core-shell concept to ferroelectric nanopowder", Journal of Materials Chemistry, 2003, 13, pp. 650-653, this document disclosing Ba$_{1-x}$Sr$_x$TiO$_3$ nanoscale particles coated with a layer of silica (SiO$_2$); and Z. Yue, X. Wang, L. Zhang and X. Yao, "Temperature stable Pb(Zn$_{1/3}$Nb$_{2/3}$)O$_3$-based composite ceramics prepared by particle-coating method", Journal of Materials Science Letters, 1997, 16(6), pp. 1354-1356, this document disclosing composite ceramic particles based on Pb(Zn$_{1/3}$Nb$_{2/3}$)O$_3$ coated with a thin glassy layer of SiO$_2$—B$_2$O$_3$.

During the sintering step, the coating layer (the shell) that surrounds each ferroelectric particle (the core) prevents the growth of these particles. This is because the coating layer isolates the ferroelectric particles from one another and prevents them from grouping together to form larger particles. The coating techniques therefore allow better control of the particle size in the final composite and a uniform particle distribution is obtained.

The coating and sintering steps result in a dense composite material formed from coated ferroelectric particles in a continuous dielectric matrix.

The desired electronic properties are a dielectric permittivity and tuneability that are similar to those of the ferroelectric and a reduction in the thermal sensitivity and in the dielectric losses. Tuneability is defined as the relative variation of the permittivity of the composite as a function of the field applied thereto.

It is an object of the invention to provide a technique for obtaining a dielectric composite material comprising at least one ferroelectric and at least one low-loss dielectric, making it possible for the structure of the composite obtained to be precisely controlled.

By controlling the structure of the composite material, it is possible to produce frequency-agile components. The agility of the component lies in the possibility of modifying its frequency response by means of an electric field as applied to it.

For this purpose, the invention proposes a method for obtaining a ferroelectric composite material, comprising the steps consisting in:

coating particles of a ferroelectric compound with a layer of a dielectric; and forming a dense composite material by sintering the coated particles, characterized in that the coating step comprises bringing the particles of the ferroelectric compound into contact with a fluid containing at least one solvent and a precursor of the dielectric, the fluid being maintained under pressure.

Within the context of the invention, the fluid containing the solvent and the precursor is considered to be under pressure when it is maintained at a pressure above about 10 bar (i.e. $10^6$ Pa).

Preferably, the fluid is maintained at a temperature above 10° C.

Preferably, the fluid is maintained under supercritical temperature and pressure conditions.

The supercritical temperature and pressure conditions are defined with respect to the pressure and the temperature at the critical point of the fluid, either in pure form or as a mixture. The critical temperature and pressure of this fluid are equal to the critical temperature and pressure of the predominant solvent.

Determining the conditions of the step of coating the particles with the ferroelectric compound in the pressurized supercritical fluid medium provides precise control of the structural parameters of the final composite obtained, and especially the thickness of the coating layer obtained.

The step of coating the ferroelectric compound particles under pressure results in coated particles whose dielectric coating layer is particularly "clean", that is to say containing few residual radicals compared to the coating techniques of the prior art.

Furthermore, the coating step carried out under pressure favors the subsequent sintering step. This is because, in the method of the invention, the coating step produces not only coated particles (type II particles) but also nanostructured particles formed exclusively from the coating material (type I particles). During the sintering step, these type I particles are distributed in the interstices formed between the coated particles.

The term "nanostructured" defines an assembly of nanoscale particles, that is to say those having dimensions of the order of a few nanometers.

Thanks to the presence of these type I particles and of the coating layer of type II particles, it is possible to obtain a dense final composite material by applying a lower sintering pressure and/or a lower sintering temperature than in the methods of the prior art.

The ferroelectric compound used may be chosen from the following materials: $PbTiO_3$, PZT, PMN, $LiNbO_3$, $KNbO_3$, KTN, $BaT_iO_3$ and $BaTiO_3$—$SrTiO_3$.

The ferroelectric compound particles consist for example of the following materials: $Ba_xSr_{1-x}TiO_3$ (BST) with x between 0 and 1, or $BaTiO_3$.

The dielectric material coating may in particular be chosen from the following oxides: $Al_2O_3$, $SiO_2$, $TiO_2$, $MgTiO_3$, $ZrO_2$, $HfO_2$, $SnO_2$, $SnO_3$ and $Ta_2O_5$.

Thanks to the method of the invention, nitrides may also be used for the coating. Coating with nitrides was not possible with the sol-gel coating techniques of the prior art (which allow only coating with oxides).

The precursor of the dielectric compound may be chosen from the family of salts, acetates, acetylacetonates and alkoxides, and more generally from the family of metal and organometallic complexes.

The solvent used may advantageously be carbon dioxide $CO_2$ (in the case of coating with oxides) or ammonia $NH_3$ (in the case of coating with nitrides).

The solvent may also be chosen from alcohols, water and mixtures thereof.

In one implementation of the invention, the method further includes a prior step of synthesizing the ferroelectric compound particles, this synthesis being carried out under pressure. The synthesis of the particles may also be carried out at a temperature above 10° C.

Preferably, the synthesis is carried out under supercritical temperature and pressure conditions.

The method of the invention makes it possible to obtain a final composite material formed from coated ferroelectric particles in a matrix of a dielectric compound, in which the dielectric compound matrix is formed from particles whose size may vary from 1 nanometer to a few millimeters, depending on the sintering temperature.

Other features and advantages will become further apparent from the following description, which is purely illustrative and nonlimiting, and must be read in conjunction with the appended figures in which:

FIGS. 3A and 3B are images obtained by scanning electron microscopy of alumina-coated BST particles obtained by secondary electrons (topographic contrast) and by backscattered electrons (chemical contrast), respectively;

FIG. 6A shows the variation in the capacitance of coated EST particles before sintering as a function of temperature and of the frequency of the signal that is applied to them and FIG. 6B shows the variation in the permittivity $\epsilon'$ of a BST ceramic containing no alumina as a function of temperature and of the frequency of the signal that is applied to it;

FIG. 7 shows the variation in the permittivity of the composite material obtained by sintering the coated BST particles;

FIG. 9 shows, in a three-dimensional plot, the variations in the tuneability of the sintered BST/alumina composite material as a function of temperature and of the applied electric field, for a frequency of 100 kHz; and FIG. 10 shows the variations in the dielectric loss factor $\tan\delta$ of the BST/alumina composite material as a function of the applied electric field, for various applied frequencies.

Figure 1:
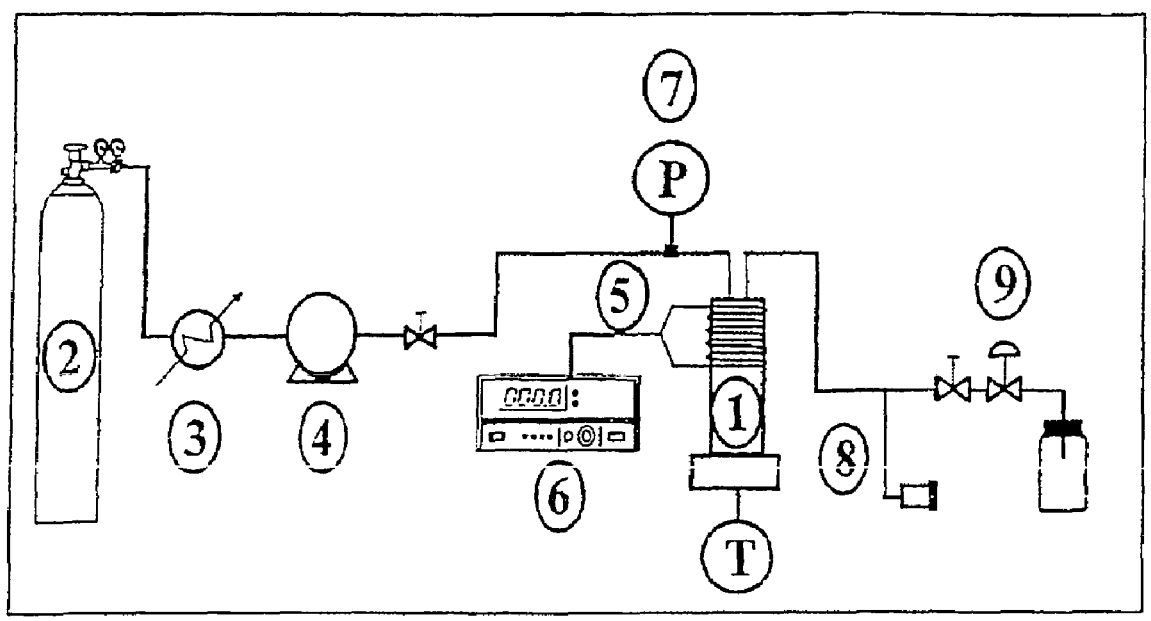
FIG. 1 shows schematically an example of an installation for implementing the coating step of the method of the invention.

The installation shown in FIG. 1 is used for synthesizing micron-scale $Ba_{0.6}Sr_{0.4}TiO_3$ (BST) particles coated with a nanostructured layer of alumina $Al_2O_3$.

The installation comprises the following elements:
- a deposition reactor 1 having an inside volume of 26.5 cm³;
- a cylinder 2 containing solvent in the form of carbon dioxide $CO_2$, the cylinder being connected via a feedline to the reactor 1;
- a cryostat 3 for regulating the temperature of the $CO_2$, injected by a high-pressure pump 4, feeding the reactor 1;
- the high-pressure pump 4;
- a heating coil 5 wound around the deposition reactor 1;
- a regulator 6 for regulating the heater 5;
- a pressure sensor 7 for measuring the pressure in the deposition reactor 1;
- a safety device 8 in the form of a ruptured disk capable of releasing the pressure in the event of an excessively large rise in the pressure in the reactor; and
- a valve 9 for depressurizing the reactor 1.

Figure 2:
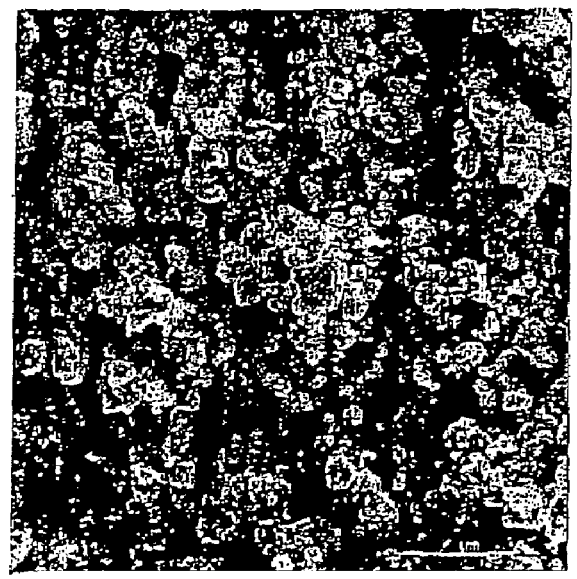
FIG. 2 is an image obtained by scanning electron microscopy of micron-scale $Ba_{0.6}Sr_{0.4}TiO_3$ (BST) particles before coating.

The micron-scale BST powder intended to be coated can be seen in FIG. 2. A mixture containing 300 mg of BST powder obtained by ceramic processing, 240 mg of aluminum acetylacetonate and 4.5 ml of absolute ethanol $CH_3CH_2OH$ is introduced into the deposition reactor 1. The high-pressure pump 4 is then turned on so that $CO_2$ from the cylinder 2 penetrates in the deposition reactor 1 so as to obtain an 80/20 $CO_2/CH_3CH_2OH$ molar ratio in the rector. The $CO_2$ is maintained at a pressure of 20° C. by the cryostat 3.

The reactor is then heated to a temperature of 200° C. by the heating coil 5, the temperature of the heater being regulated by the regulator 6. The heating to 200° C. increases the pressure in the deposition reactor 1. The pressure measured by the pressure sensor 7 is approximately equal to 20 MPa.

The reaction mixture is maintained under the supercritical temperature and pressure conditions for about 1 hour.

It should be noted that the heating coil 5 is placed against the upper portion of the body of the reactor 1 so as to generate a temperature gradient in the rector, thus agitating the BST particles to be coated.

The deposition reactor is then depressurized down to atmospheric pressure, by actuating the valve 9, the reactor being maintained at a temperature of 200° C. during the depressurization. The reactor is then cooled down to room temperature.

Depressurizing the reactor results in complete extraction of the solvent.

The material in the reactor therefore consists of a clean dry powder (which may be seen in FIGS. 3A and 3B) comprising two types of particle:
- a population of type I particles, consisting of spherical alumina particles; and
- a population of type II particles, consisting of alumina-coated BST particles.

The determination of the nature of these two types of particle was validated by Auger spectroscopy. The decomposition of the precursor aluminum acetylacetonate results in the growth of alumina nanoparticles (with dimensions of about 5 to 200 nm) which aggregate into spherical nanostructured alumina particles (thus forming the type I particles) or are deposited on the surface of the BST particles in the form of a nanostructured layer (type II particles).

Figure 4:
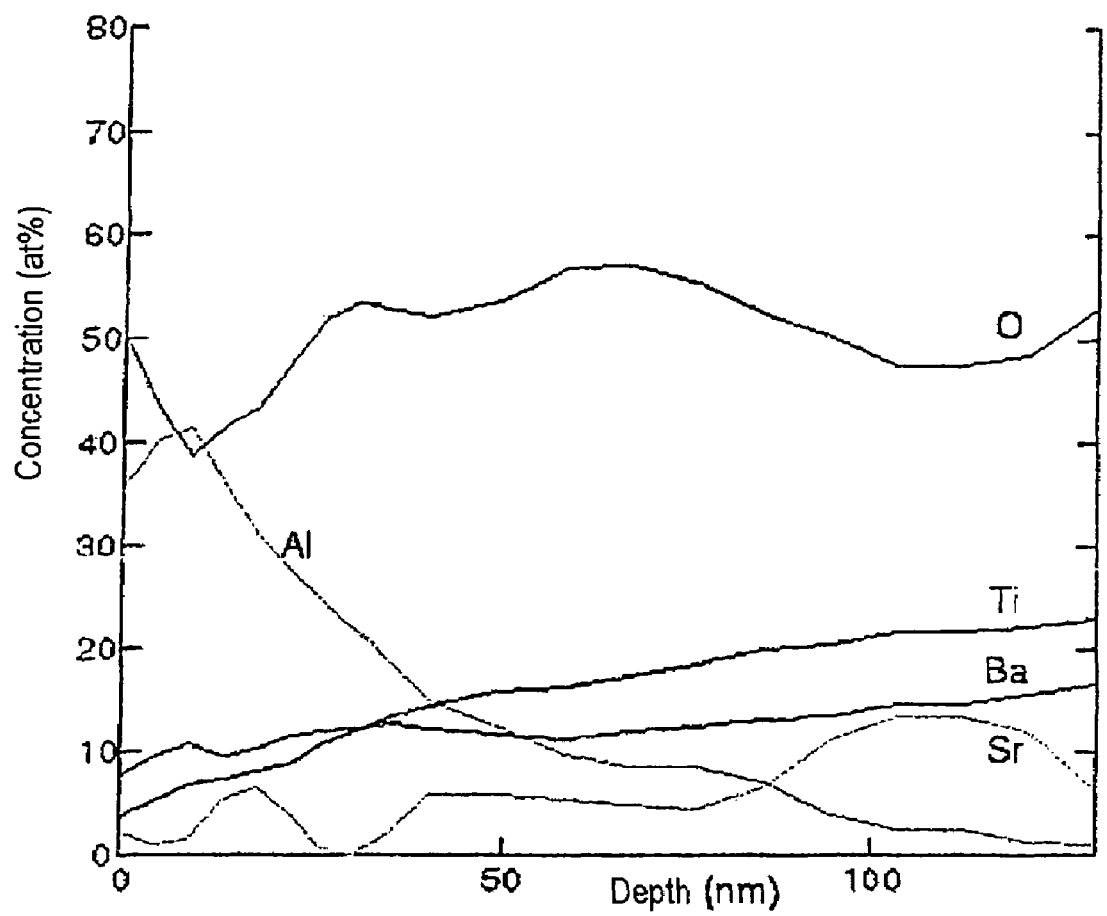
FIG. 4 is a plot showing the chemical composition profile of an alumina-coated BST particle.

FIG. 4 shows the chemical composition profile of an alumina-coated BST particle (type II particle).

The powder containing the coated BST particles is formed by uniaxial pressing at 100 MPa for 1 minute and sintering at 1400° C. for 2 hours. This results in the formation of a BST/alumina ferroelectric composite.

Figure 5:
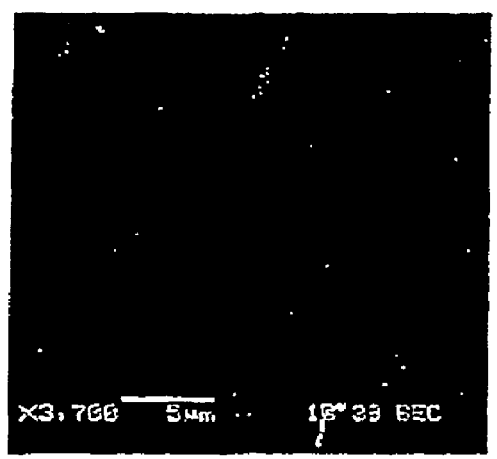
FIG. 5 is an image obtained by scanning electron microscopy of a section of composite material obtained by sintering coated BST particles.

FIG. 5 shows that the composite material obtained is dense and consists of BST particles (light areas) isolated from one another by alumina (dark areas). The nanostructured alumina layer prevents the growth of BST particles during sintering. Furthermore, the nanostructured aluminum particles release small particles that fill up the spaces between the BST particles. It follows that the structure of the composite material obtained is particularly dense and has few voids. The fact that the alumina is present in nanostructured form makes it possible to lower the sintering temperature (1400° C.) compared with the conventional alumina sintering temperature (1600° C.).

Controlling the conditions of the BST particle coating step in a supercritical fluid medium makes it possible for the structure of the final BST/alumina composite, and especially the thickness of the alumina coating layer, to be precisely determined.

The parameters of the supercritical-fluid coating step that can be modified in order to adjust the structural characteristics of the composite are the following:
- pressure in the reactor;
- coating temperature;
- precursor concentration;
- residence time in the reactor;
- nature of the supercritical solvent; and
- addition of a cosolvent.

These parameters may be adjusted in order to control the characteristics of the BST core of the coated particles (core size, morphology, chemical composition, etc.) and the characteristics of the alumina shell (nanostructure characteristics, chemical composition, etc.). Such adjustment of the parameters was not possible with the coating techniques of the prior art.

The sintering step also influences the final structure of the composite. The key parameters are;
- the sintering pressure;
- the sintering temperature; and
- the sintering time.

These parameters may also be adjusted in order to control the cohesion of the assembly.

The dielectric characteristics of this composite material, defined by impedance measurement, were compared with the characteristics of an alumina-free BST ceramic sintered for 2 hours at 1400° C. An improvement in the dielectric properties of the BST/$Al_2O_3$ material over the BST material alone may be seen. Thus, the following are observed:
- a broadening of the permittivity peak, and consequently a reduction in the thermal sensitivity of the composite, without any shift in the permittivity maximum;
- low dielectric losses tanδ;
- preservation of the electrical properties up to frequencies of a few gigahertz, especially the ferroelectric and nonlinear properties, of the initial alumina-coated BST powder; and
- frequency-independent tuneability (for frequencies between substantially 100 hertz and 1 gigahertz) and a dielectric loss factor tanδ independent of the electric field applied to the composite.

FIG. 6A shows the variation in the capacitance C of coated BST particles before sintering as a function of the frequency applied to them. FIG. 6B shows the variation in the permittivity $\epsilon'$ of the alumina-free BST ceramic as a function of the frequency applied to it. The coated BST powder has, before sintering, a maximum capacitance at about 250 K, irrespective of the frequency applied to it (FIG. 6A). The BST ceramic with no added alumina has a maximum permittivity at 285 K (FIG. 6B). The measured permittivity has a very narrow peak centered on the Curie temperature corresponding to the BST paraelectric/ferroelectric transition.

The sintered BST/alumina composite material (FIG. 7) has a maximum permittivity (or capacitance) at the same temperature (250 K) as the unsintered BST powder (FIG. 6). This demonstrates the fact that the alumina prevents the growth of BST particles. A second permittivity peak observed at a temperature of 215 K, corresponding to the BST tetragonal/orthorhombic transition, is also found in the case of the unsintered powder and in the case of the sintered BST/alumina composite.

Figure 8A:
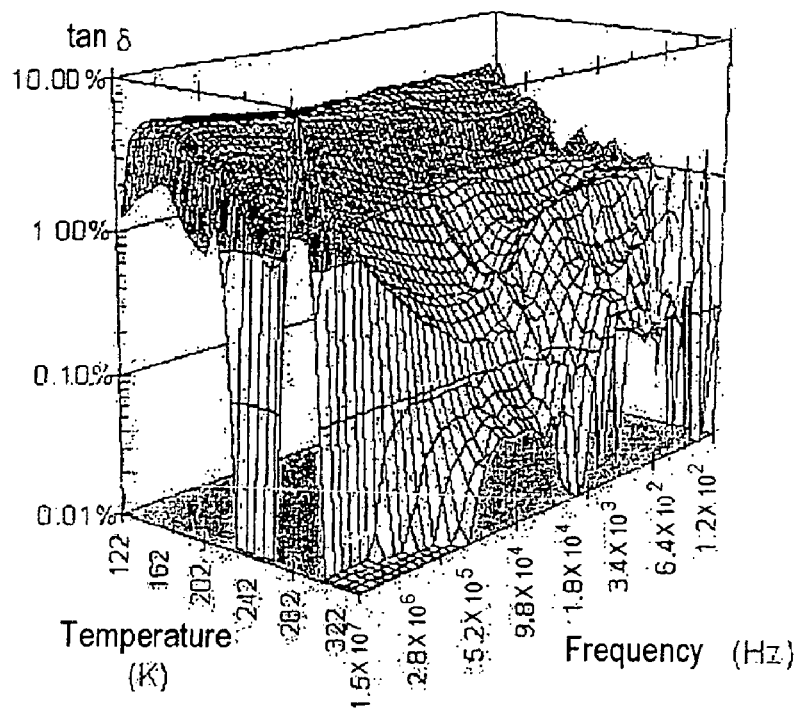
FIGS. 8A and 8B show, in a three-dimensional plot, the variations in the dielectric loss factor $\tan\delta$ for a conventional BST ceramic and for the sintered BST/alumina composite material, respectively, as a function of temperature and of the applied frequency.
Figure 8B:
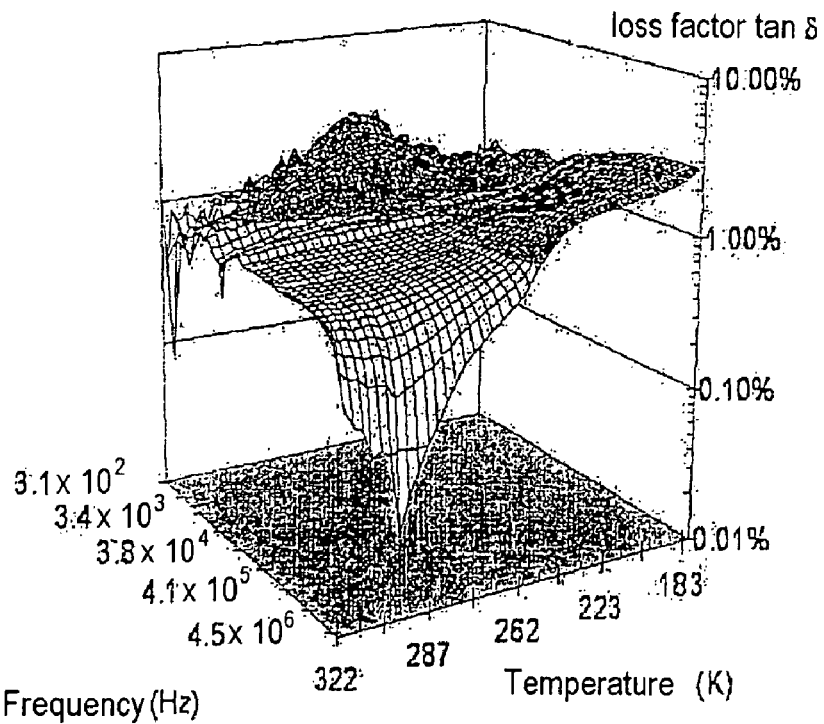

Comparing FIGS. 8A and 8B demonstrates the improvement in terms of dielectric loss provided by the BST/alumina composite material compared with a BST ceramic with no added alumina. FIG. 8A shows the variations in the dielectric loss factor tanδ for a conventional BST ceramic as a function of temperature and of the applied frequency. FIG. 8B shows the variations in the dielectric loss factor tanδ for the sintered BST/alumina composite material. Unlike a conventional BST ceramic, the dielectric loss factor tanδ of the BST/alumina composite material varies little as a function of temperature and frequency. Furthermore, it may be seen in FIG. 8B that the loss factor is less than 1% (the limit required for microelectronic applications) over a broad temperature and frequency range (the light area shown in the figure) and remains close to this limit (it reaches a maximum of 2.5%) outside this range (the dark area shown in the figure).

FIG. 9 shows the variations in the tuneability of the sintered BST/alumina composite material as a function of temperature and the applied electric field, for a frequency of 100 kHz. The tuneablity is defined as the relative variation in the permittivity as a function of the applied field. This figure shows that the nonlinear properties of the BST are also preserved in the sintered BST/alumina composite material.

The tuneability of the BST/alumina composite reaches 2% at the temperature of the permittivity maximum (Curie temperature) for a modest electric field of 0.8 kV/cm.

FIG. 10 shows the variations in the dielectric loss factor tanδ of the BST/alumina composite material as a function of the electric field applied to it, for various frequencies of this field. The measurements performed at 300 K show that the tuneability is independent of the frequency of the field for frequencies between 100 Hz and 1 MHz and that the dielectric loss does not depend on the applied electric field.

The invention claimed is:

1. A method for obtaining a ferroelectric composite material, comprising:
    coating particles of a ferroelectric compound with a layer of a dielectric; and
    forming a dense composite material by sintering the coated particles,
    characterized in that the coating step comprises bringing the particles of the ferroelectric compound into contact with a fluid containing at least one solvent and a precursor of the dielectric, wherein the fluid containing the solvent and the precursor is maintained under supercritical temperature and pressure conditions.

2. The method as claimed in claim 1, characterized in that it further includes a prior step of synthesizing the ferroelectric compound particles, this synthesis being carried out under pressure.

3. The method as claimed in claim 2, characterized in that the synthesis of the particles is carried out at a temperature above 10° C.

4. The method as claimed in claim 2, characterized in that the synthesis is carried out under supercritical temperature and pressure conditions.

5. The method as claimed in claim 1, characterized in that the ferroelectric compound is chosen from the following materials: $PbTiO_3$, PZT, PMN, $LiNbO_3$, $KNbO_3$, KTN, $BaTiO_3$ and $BaTiO_3$—$SrTiO_3$.

6. The method as claimed in claim 1, characterized in that the ferroelectric is $Ba_xSr_{1-x}TiO_3$ or $BaTiO_3$.

7. The method as claimed in claim 1, characterized in that the dielectric compound is chosen from oxides or nitrides.

8. The method as claimed in claim 7, characterized in that the dielectric compound is chosen from the following oxides: $Al_2O_3$, $SiO_2$, $TiO_2$, $MgTiO_3$, $ZrO_2$, $HfO_2$, $SnO_2$, $SnO_3$ and $Ta_2O_5$.

9. The method as claimed in claim 1, characterized in that the precursor of the dielectric compound is chosen from the family of salts, metal and organometallic complexes.

10. The method as claimed in claim 1, characterized in that the solvent comprises $CO_2$ or $NH_3$.

11. The method as claimed in claim 1, characterized in that the solvent is chosen from alcohols, water or a mixture thereof.

12. The method as claimed in claim 1, characterized in that the ferroelectric compound particles have dimensions of around 5 nm to 1 µm.

13. The method as claimed in claim 1, characterized in that the dielectric compound coating layer has a thickness of around 1 nm to 10 µm.

14. The method as claimed in claim 3, characterized in that the synthesis is carried out under supercritical temperature and pressure conditions.

15. The method as claimed in claim 9, characterized in that the precursor of the dielectric compound is chosen from the family of acetates, acetylacetonates or alkoxides.

* * * * *